J. KOZAK.
TROLLEY RETRIEVER.
APPLICATION FILED NOV. 26, 1918.
1,336,966.
Patented Apr. 13, 1920.
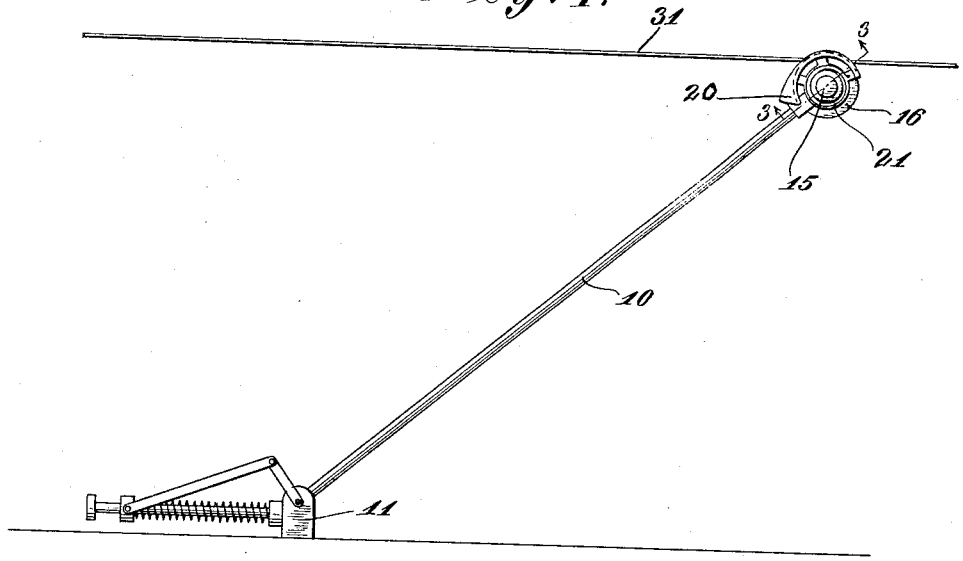
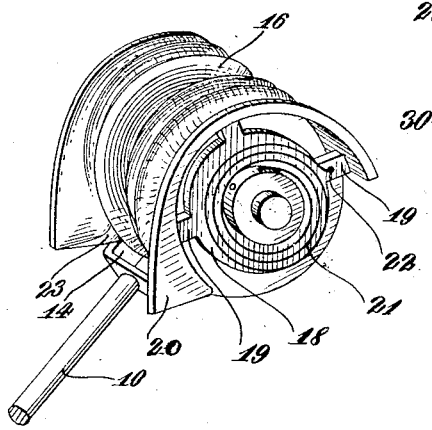
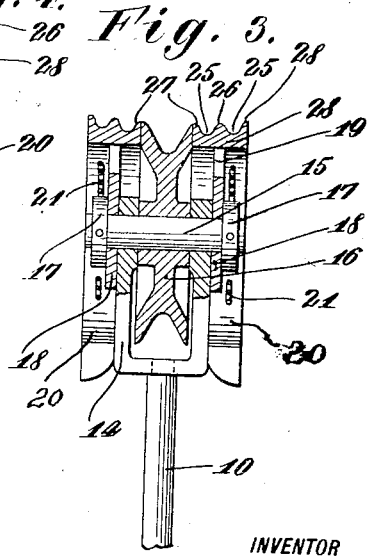
INVENTOR
John Kozak.
BY
his ATTORNEY

UNITED STATES PATENT OFFICE.

JOHN KOZAK, OF MILWAUKEE, WISCONSIN.

TROLLEY-RETRIEVER.

1,336,966.  Specification of Letters Patent.  Patented Apr. 13, 1920.

Application filed November 26, 1918. Serial No. 264,152.

*To all whom it may concern:*

Be it known that I, JOHN KOZAK, a citizen of Poland, residing at Milwaukee, county of Milwaukee, and State of Wisconsin, have invented certain new and useful Improvements in Trolley-Retrievers, of which the following is a specification.

This invention relates to improvements in trolley retrievers and has as its special object the provision of means whereby should the wire inadventently become separated from the trolley wheel that it may be automatically replaced thereon.

A further object is to provide such devices in forms which may be readily applied to trolley poles of common construction without alteration or changes therein.

These and other like objects are attained by the novel construction and combination of parts, hereinafter described and shown in the accompanying drawings, forming a material part of this disclosure, and in which—

Figure 1 is a side elevational view showing the application of the device.

Fig. 2 is a perspective view showing the head of the trolley pole.

Fig. 3 is an enlarged sectional view taken on line 3—3 of Fig. 1, and,

Fig. 4 is a side elevational view showing one of the retrieving elements in detail.

Referring to the drawings, the trolley pole 10 is seen supported in a bracket 11 extended upward from the roof of a car or like vehicle, and held normally in a raised angular position, due to the mechanism employed.

The upper end of the trolley pole terminates in a pair of forks 14, in which is journaled a spindle 15, extending through at both ends and having fixed thereon, between the forks 14, a grooved pulley 16 of the usual type of construction.

Secured to the outer ends of the spindle 15, are collars 17, having between their inner faces, and the outer surface of the forked arms 14, loose disks 18 from which extend arms 19, connected with the interior of segmental retrievers 20, the same presenting an arcuate, semi-circular profile extending outwardly at both sides of the arms 19.

The lower edges 23 of the retrievers are adapted to make contact with the lower portions of the forks 14 and are normally held thereagainst by the action of spiral wound springs 21, the inner ends of which are secured to the fixed collars 17, their outer ends being engaged with one of the arms 19.

The outer surfaces of the retrievers 20, are formed with a pair of sinuous grooves 25, having between them a raised ridge 26, similar ridges 27 being formed upon their inner sides, that is the side next adjacent to the trolley wheel 16, while their outer edges 28 are formed at a larger radius so as to normally prevent the wire passing from the retrievers should it escape the groove of the pulley 16.

Both of the grooves 25 terminate in a curved recess 30, coincident with the bottom of the recess 25 and adapted to replace the trolley wire 31, should it escape the groove of the pulley 16.

In operation, should the wire inadvertently move out from the groove of the pulley 16, it will make contact with the grooves 25 and by friction turn the retrievers against the pull of the springs 21, thereby bringing the curved groove 30 adjacent to the edge of the pulley 16, replacing the wire in an obvious manner in its proper position.

When the retrieving elements 20 are released from contact with the wire the pull springs 21 return them to their normal position.

From the foregoing it will be seen that a simple and effective device has been disclosed for retrieving trolley wires and that the same works automatically without labor on part of the operator.

Having thus described my invention what I claim as new and desire to secure by Letters Patent, is—

In a device of the class described, the combination with a fork, a spindle fixed in the arms of said fork and extended beyond the same, and a pulley disposed for rotation on said spindle between said arms, of arcuate retrieving elements, one being disposed on each side of said pulley, a collar fixed to each end of said spindle, a loose disk disposed on the spindle between each of said collars and the adjacent fork-arm, connecting arms extending from said disks to the adjacent retrieving elements, a spring for yieldably holding each of said elements in operative position, one end of each spring being secured to one of said collars and its other end connected with the adjacent element, and a plurality of longitudinally extending alternate ridges and grooves formed on the periphery of each of said elements, the grooves of each of the elements being curved toward the pulley at their inner ends to direct a wire or the like onto said pulley, the ridges of said elements remote from the pulley being formed on a larger radius than the ridges adjacent said pulley whereby to prevent the wire or the like passing off of said elements.

In testimony whereof I have affixed my signature.

JOHN KOZAK.